United States Patent [19]

Bean et al.

[11] 4,142,234
[45] Feb. 27, 1979

[54] BIAS FILTER MEMORY FOR FILTERING OUT UNNECESSARY INTERROGATIONS OF CACHE DIRECTORIES IN A MULTIPROCESSOR SYSTEM

[75] Inventors: Bradford M. Bean, New Paltz; Keith N. Langston, Ulster Park; Richard L. Partridge; Kian-Bon K. Sy, both of Poughkeepsie, all of N.Y.

[73] Assignee: International Business Machines Corporation, Armonk, N.Y.

[21] Appl. No.: 855,485

[22] Filed: Nov. 28, 1977

[51] Int. Cl.$^2$ ................... G06F 13/00; G06F 15/16
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 3,771,137 | 11/1973 | Barner | 364/200 |
| 3,967,247 | 6/1976 | Andersen | 364/200 |
| 3,984,818 | 10/1976 | Gnadeberg | 364/200 |
| 4,056,844 | 11/1977 | Izumi | 364/200 |
| 4,084,234 | 4/1978 | Calle | 364/200 |

*Primary Examiner*—James D. Thomas
*Attorney, Agent, or Firm*—Bernard M. Goldman

[57] ABSTRACT

The disclosed embodiments filter out many unnecessary interrogations of the cache directories of processors in a multiprocessor (MP) system, thereby reducing the required size of the buffer invalidation address stack (BIAS) with each associated processor, and increasing the efficiency of each processor by allowing it to access its cache during the machine cycles which in prior MP's had been required for invalidation interrogation. Invalidation interrogation of each remote processor cache directory may be done when each channel or processor generates a store request to a shared main storage.

A filter memory is provided with each BIAS in the MP. The filter memory records the cache block address in each invalidation request transferred to its associated BIAS. The filter memory deletes an address when it is deleted from the cache directory and retains the most recent cache access requests.

The filter memory may have one or more registers, or be an array. Invalidation interrogation addresses from each remote processor and from local and/or remote channels are received and compared against each valid address recorded in the filter memory. If they compare unequal, the received address is recorded in the filter memory as a valid address, and it is gated into BIAS to perform a cache interrogation. If equal, the inputted address is prevented from entering the filter memory or the BIAS, so that it cannot cause any cache interrogation. Deletion from the filter memory is done when the associated processor fetches a block of data into its cache. Deletion may be of all entries in the filter memory, or of only a valid entry having an address equal to the block fetch address in a fetch address register (FAR). Deletion may be done by resetting a valid bit with each entry.

21 Claims, 7 Drawing Figures

BIAS CONTROL OF CACHE

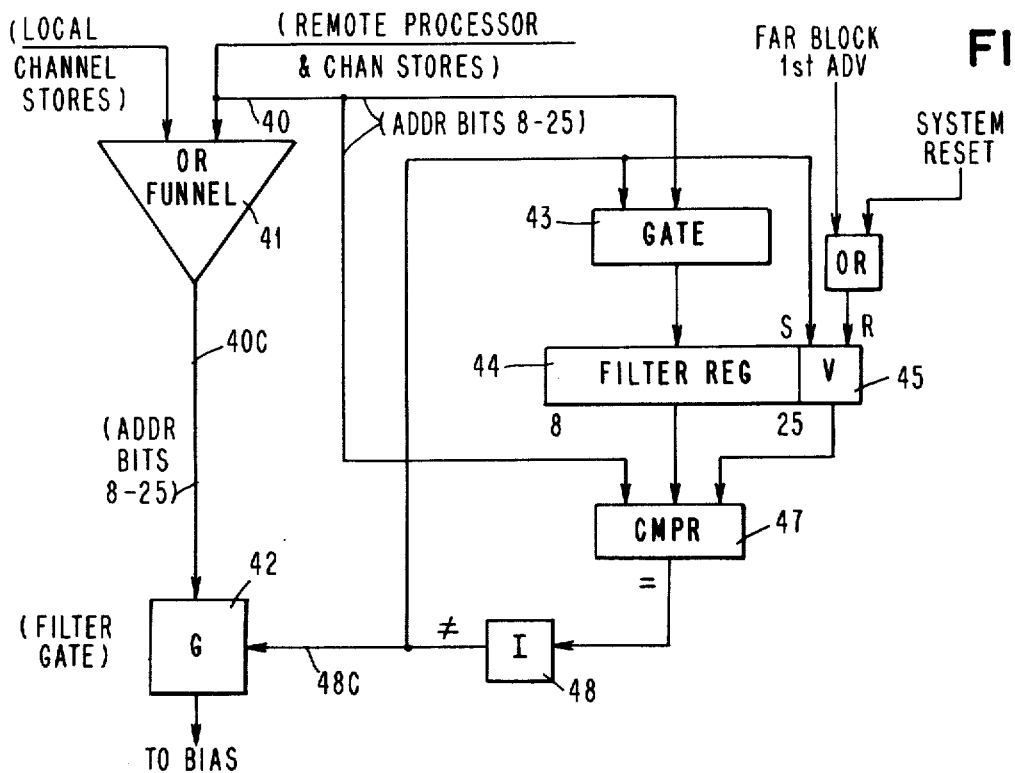
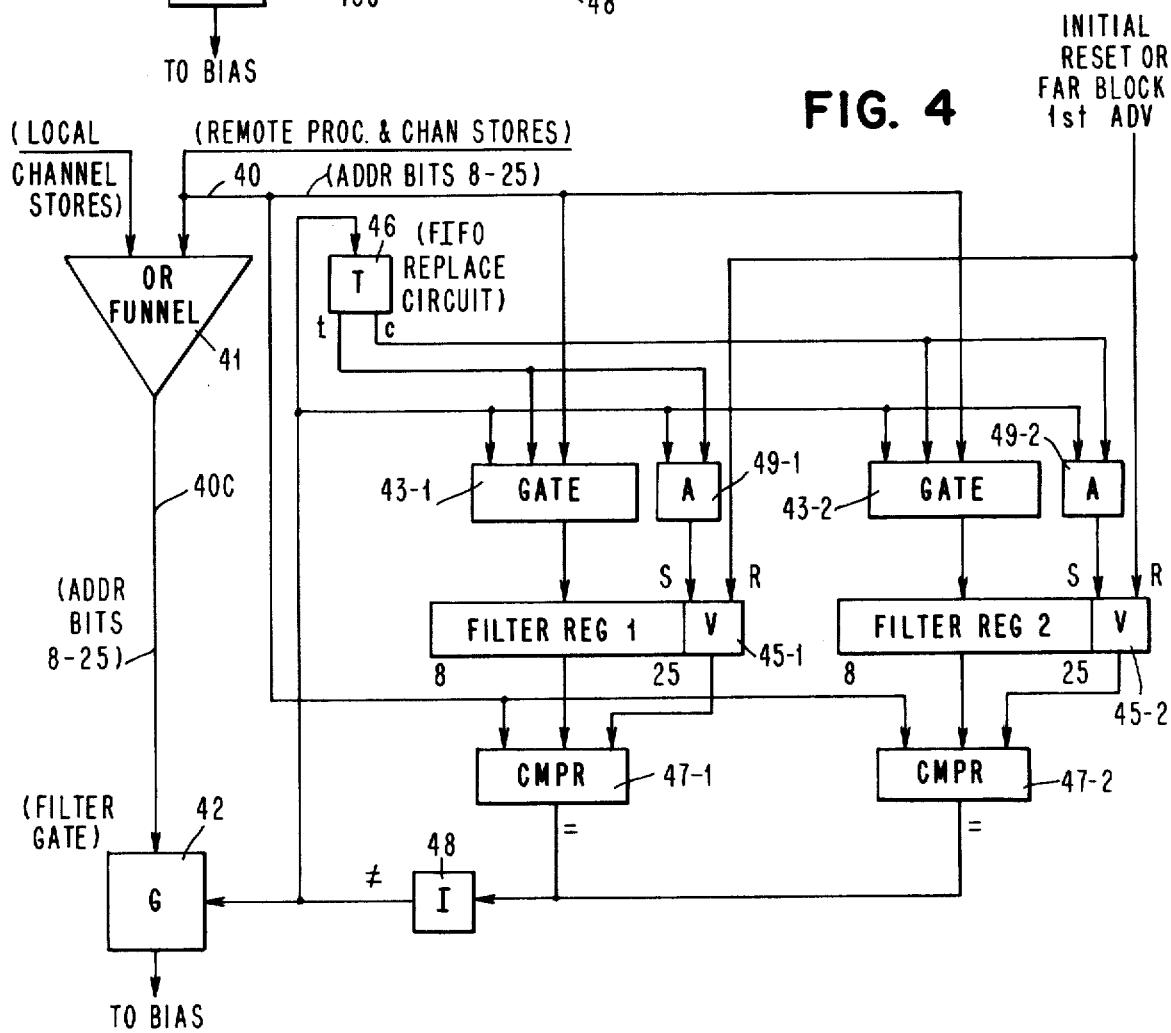

BIAS FILTER MEMORY FOR FILTERING OUT UNNECESSARY INTERROGATIONS OF CACHE DIRECTORIES IN A MULTIPROCESSOR SYSTEM

INTRODUCTION

This invention relates to improving the efficiency of cache entry invalidation controls in a uniprocessor (UP) or multiprocessor (MP) system.

PRIOR ART

In existing commercial UP and MP systems using caches, data and instructions may exist in more than one copy in one or more caches. Means is provided to insure that when the content of any cache copy is changed, that no unchanged copy remains in any cache.

For example, in the IBM System/370 Model 168 MP, data integrity is maintained by comparing every store address (as opposed to a fetch address) derived remotely from a given processor with the addresses currently in the given processor's cache directory. (The remotely derived addresses include each store address provided with each double word to be stored by a channel or from the other processor.) A buffer invalidation address stack (BIAS) is provided in each processor to receive remote store addresses, so as to invalidate them in the given processor's cache directory. Each such invalidation request entered into each BIAS takes one or two machine cycles from the given processor to interrogate its cache directory for the address of that store request. If that address is found to be valid in the cache directory, the address is invalidated. This maintains data integrity in the MP system. BIAS invalidation interrogations have priority over local processor accesses to its associated cache directory. More specifically, each BIAS interrogation of a cache directory steals two cycles from the processor for a cache hit and steals one cycle for no hit. As the number of BIAS interrogations increase with each processor, it is increasingly denied access to its cache, and it suffers performance degradation.

The subject invention lessens the processor degradation by recognizing and eliminating many redundant BIAS interrogations of each cache, which permits each processor to use most of the machine cycles which in prior machines were lost to BIAS interrogations of each cache.

For example, the cache with each processor in a Model 168 MP has a cache block size of 32 bytes. If either processor is performing a block store operation, for instance, executing a move character instruction, e.g. MVC or MVCL, for every double word of data to be stored a BIAS invalidation interrogation is required of the cache directory of the other processor. Since the block size contains four double words, four BIAS invalidation accesses are required in the other cache directory for every block of data being transferred to main storage (M.S.) by the given processor which causes two invalidations to the same block. Each block move will therefore steal four to six machine cycles for BIAS operation of the other processor to correspondingly slow it down and correspondingly decrease MP performance.

SUMMARY OF THE INVENTION

It is the primary object of the subject invention to reduce the number of BIAS interrogations of a cache of a processor.

It is a further object of the invention to reduce most, if not all, BIAS interrogations to one BIAS interrogation per cache block, rather than the current requirement of one BIAS interrogation for every double word store request by another processor or channel.

It is a still further object of this invention to provide BIAS filtering which permits a reduction in the size of the BIAS array because of the reduction in the number and frequency of entries gated into the BIAS array.

The invention recognizes each remote store request to the same cache block after the first BIAS request for that block address. For example, in a sequence of eight processor double word (DW) store request addresses starting at the beginning of a cache block of eight DW's, the first DW store request into a cache block is recognized as a BIAS interrogation of each other cache that can access the same shared memory. Thereafter, the invention inhibits (i.e. filters out) from entering the remote BIAS the remaining seven double word (DW) store requests to the same block. Thus, one to two machine cycles are stolen by the invention for BIAS operation; while in the prior M168, eight to twelve cycles are stolen for BIAS operation for the same eight DW's. Hence, MP performance is improved.

A filter memory is provided by the invention with each BIAS and cache directory. Each filter memory retains the most recent cache block address(es) that have been passed to its BIAS for interrogating the associated cache directory, which is often called a buffer address array., and the cache is often called a high speed buffer. Subsequent addresses remotely provided by another processor or channel that would interrogate the same cache block address are "filtered out" by not being passed to the associated BIAS. By "filtering out" many unnecessary interrogations of the cache directory, there is removed much of the remotely generated interference that in prior MP has delayed each processor in accessing its own cache.

As the cache directory addresses are changed by block fetches by the associated processor, any corresponding address in the filter memory is invalidated, and the entry becomes available for receiving another cache block address from the next new remote store request.

The implementation of the filter memory may be an array, or one or more registers. Remote processor stores, and local and remote channel stores are inputted and compared against address(es) in the filter memory. If not equal to any valid address, in the filter memory, the inputted address is recorded as a valid entry in the filter memory, and it is gated into BIAS. If equal to any valid address, the inputted address is not entered into the filter memory, and it is not gated to BIAS, so that no cache interrogation results.

Deletion from the filter memory is done when the associated processor fetches a block of data into its cache, which will change the data in a block in its cache. This is monitored in the invention embodiments by comparing each block fetch address put into the processor's fetch address register (FAR) with every valid address in the filter memory. A compare equal causes the compared address to be deleted from the filter memory by invalidating the entry containing that address. Alternatively, all entries in the filter memory may be invalidated on a block fetch, to simplify the hardware structure of the invention with some loss in performance.

The size of the filter memory need not be large to provide efficient filtering. Two registers comprising a filter memory have been found to provide a significant improvement in system performance.

When any processor in an MP making a store request has priority for accessing the shared main storage (MS), the store address is broadcast to the filter memory(s) associated with the other processors in the MP. The broadcast store address is compared with the valid address(es) in each other filter memory in the MP. If no compare equal is obtained in any filter memory, or if all entries are invalid in any filter memory, the broadcast store address is loaded into that filter memory, and the address is gated into the associated BIAS. If a compare equal is obtained in any filter memory, the address has already been put into the associated BIAS, and it is not transferred into either the filter memory or the associated BIAS. This inhibits (i.e. filters out) each future invalidation interrogation of the same address until it is deleted from the filter memory. Deletion in any filter memory is done when FAR is loaded in its processor. The block fetch address in FAR is compared with all valid block addresses in the associated filter memory. If a compare equal is obtained, the entry is invalidated in the associated filter memory.

Uniprocessor performance can also be improved by the subject invention if high speed channels are attached to the uniprocessor, since channels act like an independent processor in relation to a shared memory.

Other objects, features and advantages of the present invention will become more apparent in the light of the following detailed description of preferred embodiments thereof, as illustrated in the drawings.

BRIEF DESCRIPTION OF THE DRAWINGS

FIGS. 3, 4, 5 and 6 illustrate different embodiments of the invention.

DESCRIPTION OF THE EMBODIMENTS

Figure 1:
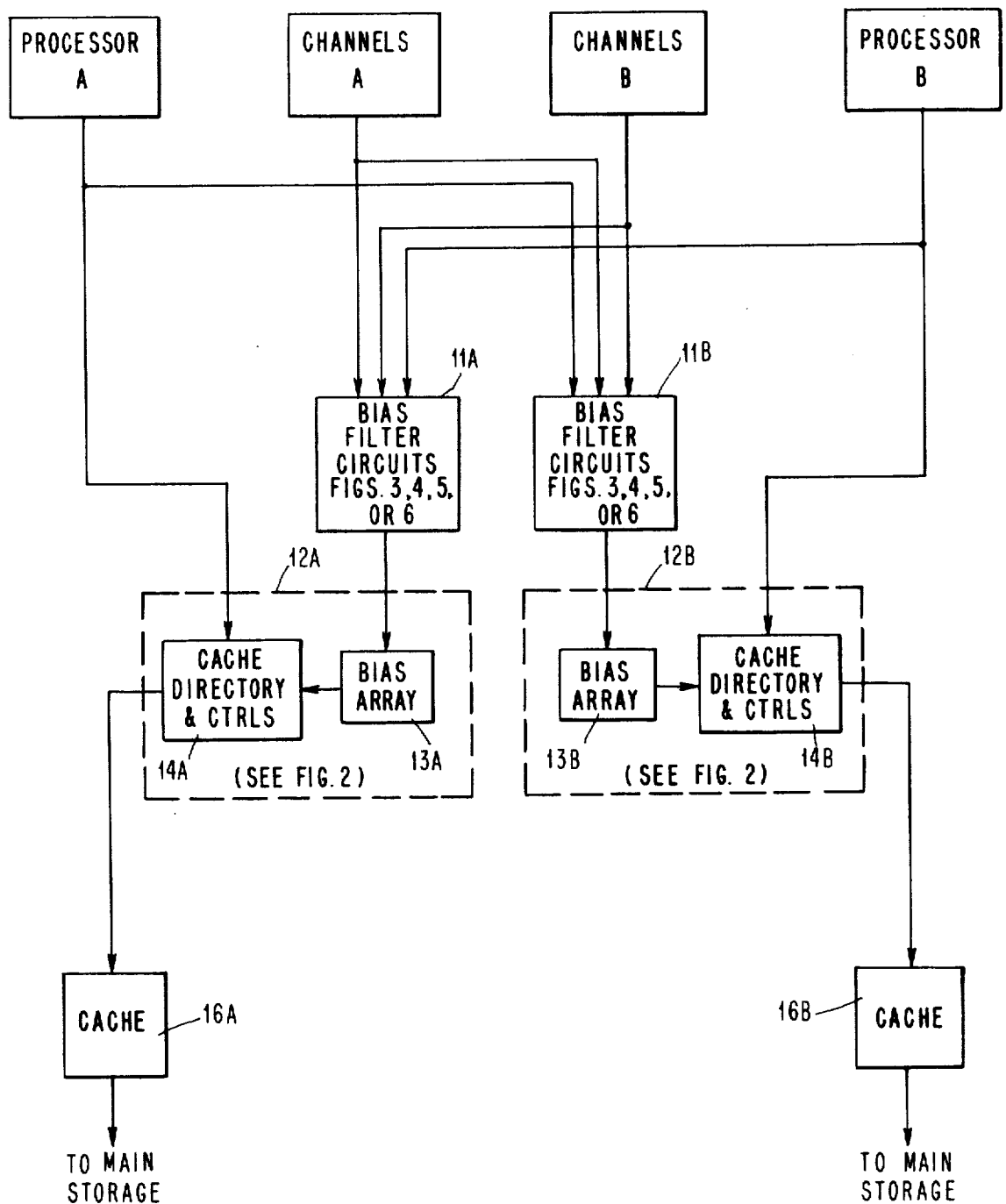
FIG. 1 is an overall block diagram of a multiprocessor (MP) system containing the subject invention.

FIG. 1 illustrates an MP system containing the subject invention. The MP system has two processors, A and B. Channels A are physically associated with processor A, and channels B are physically associated with processor B.

The reference numbers in FIG. 1 use the letters A and B to identify the processor with which the reference number is associated. BIAS filter circuits 11A and 11B each receive store request addresses from the other (i.e. remote) processor and from both local and remote channels. "Local" identifies items associated with a given processor, and "remote" identifies items associated with the other processor. Thus, filter circuits 11A are local to processor A and receive store requests from local channels A and from remote processor B and remote channels B. Likewise, filter circuits 11B are local to processor B and receive store requests from its local channels B and from remote processor A and remote channels A.

Cache control circuits 12A and 12B each comprise a cache directory and controls 14, and its BIAS array 13. The cache directory 14 locates accesses in an associated cache 16. Both caches 16A and 16B interface a shared main storage (MS) either directly or indirectly.

Figure 2:
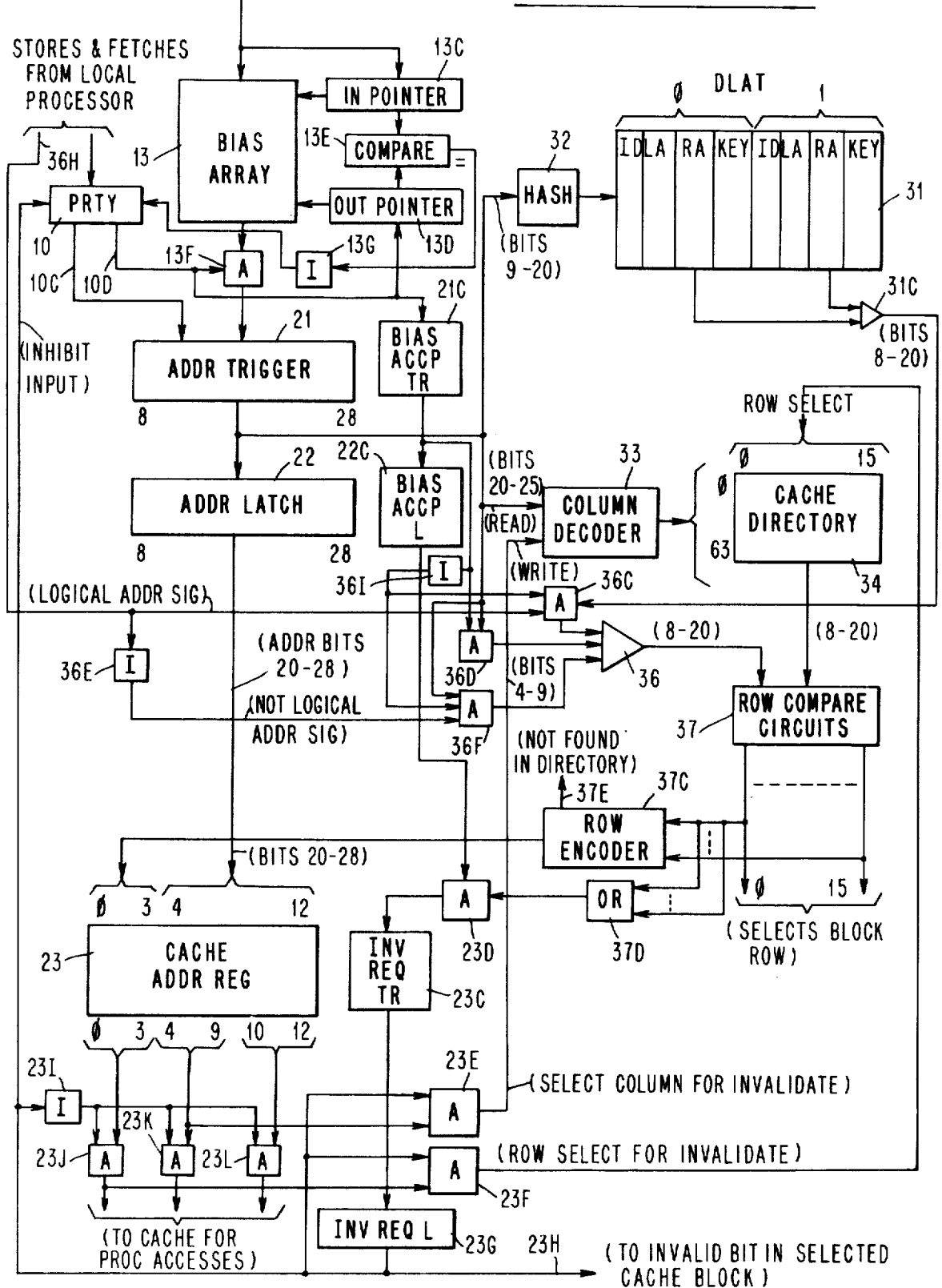
FIG. 2 illustrates BIAS control of a cache directory.

FIG. 2 shows in more detail the BIAS control with each cache control circuit 12. It includes BIAS array 13, which is connected to receive the output of the subject invention, which may be provided from any embodiment shown in FIGS. 3, 4, 5 or 6. An address trigger 21 receives each invalidation request address outputted from the BIAS 13 (which is to be invalidated in a cache directory 34.). The address trigger 21 also receives each store and fetch request address from the local processor. A priority circuit 10 of conventional type controls the inputs to trigger 21 and gives priority on a line 10D to an invalidation request from BIAS 13 over a processor request priority on line 10C when they simultaneously want to output to trigger 21. Each request received in address trigger 21 remains for ¼ machine cycle and transfers its content to an address latch 22. Both trigger 21 and latch 22 retain the address for one machine cycle with ¼ cycle overlap.

In more detail, BIAS array 13 receives cache invalidation request addresses filtered by this invention. BIAS 13 stores each received invalidation request at an entry location selected by the value in an inpointer counter 13C, which is incremented to address the next BIAS location in array 13 immediately after each invalidation request is inputted into BIAS 13. Each entry received in BIAS 13 is outputted from array 13 in FIFO order, and is located by the value in an outpointer counter 13D, which is incremented to its next higher value immediately after an entry address is outputted from BIAS 13. The outputting of each next BIAS entry into address trigger 21 continues on each machine cycle until all inputted entries have been outputted, which is indicated by an equal signal provided by a compare circuit 13E, which is comparing the BIAS location addresses in inpointer 13C and outpointer 13D. Whenever compare circuit 13E provides an equal output, it causes inverter 13G to provide an inhibit signal to priority circuit 10 which inhibits an AND gate 13F from providing any further signal output from BIAS 13 to address trigger 21.

A priority signal on line 10D causes the outputting of an invalidation request from BIAS output gate 13F to address trigger 21, and increments outpointer 13D to its next value.

Both the inpointer 13C and outpointer 13D are initially reset to zero so that the first entry in BIAS 13 receives the first input. Both the inpointer 13C and the outpointer 13D wrap back to 0 after containing the highest location in BIAS 13.

Therefore, whenever BIAS 13 outputs an address to trigger 21, the stores and fetches from the local processor are inhibited from being accepted by the address trigger 21 by the priority circuit 10 which gives priority to outputs of BIAS 13. Thus, local processor requests are inputted into register 21 when there is no output from the BIAS array so that normal local processor cache accessing operations can then occur.

Most BIAS operations probably will involve a single contained invalidation address at a time in BIAS 13, and many machine cycles may occur between the inputting of invalidation addresses into BIAS 13. This will permit many cache accesses by the local processor between invalidation cache accesses.

In FIG. 2 each BIAS invalidation request inputted to trigger 21 steals one machine cycle for interrogating the cache directory. If the invalidation request is found in the directory 34, a second machine cycle is stolen from the local processor for invalidating the address found in directory 34. During each stolen cycle, the local processor is prevented from inputting a fetch or store request into address trigger 21 which will degrade processor operation.

The BIAS output signal on line 10D sets a BIAS accept trigger 21C, which flags a BIAS invalidation request currently in address trigger 21. Trigger 21C remains set for one machine cycle (in synchronism with address trigger 21) and propagates its single bit invalidate signal to a BIAS accept latch 22C (in synchronism with address latch 22), during which accept latch 22C conditions an AND gate 23D for passing the invalidate signal to an invalidate request trigger 23C if the cache directory is found to contain a valid block address equal to the invalidation request received by address trigger 21. If the directory has no equal valid block address, or the selected block valid bit is set to the invalid state, AND gate 23D is disabled by an output from an OR circuit 37D, and the invalidate signal in latch 22C is terminated. However, if the invalidation request is found in the directory, trigger 23C is set during the next machine cycle and the invalidate signal is propagated i/2 cycle later to an invalid request latch 23G, during which it provides an output on a line 23H for one cycle.

The invalidate signal output of latch 23G is also provided back to priority circuit 10 to inhibit any input to address trigger 21 during the next cycle while the selected valid bit in the cache directory is being reset to the invalid state by the signal on line 23H. This inhibiting of inputs to address trigger 21 causes one machine cycle to be lost for the invalidation of the block address found in the cache directory as signalled by OR circuit 37D. But no machine cycle is lost for invalidation if no equal and valid directory address is found for an invalidation request from BIAS 13 because the invalidate signal was terminated in gate 23D due to lack of a cache hit signal from OR circuit 37D.

When an invalidation request is received in address trigger 21 as indicated by the setting of accept trigger 21C, an invalidation test is made to determine if that address validly exists in the cache directory 34. The invalidation test is controlled by AND gate 36D being enabled by accept trigger 21C. Then gate 36D passes the invalidation address bits 8–20 from trigger 21 through OR funnel 36 to the directory.

If no invalidate bit is set in accept trigger 21C, a normal processor cache access is made under control of a logical address signal on a line 36H from the processor. For normal processor requests in address trigger 21, either an AND gate 36C or 36F will be activated. An inverter 36I will condition both gates 36C and F during normal processor requests. Gate 36C is activated if a logical address is in trigger 21 that requires translation in DLAT 31. A translated address from DLAT 31 is obtained using bit positions 9–20 of address trigger 21 which are transferred to the directory lookaside table (DLAT) hash addressing circuit 32. The translated address bit 8–20 from DLAT funnel 31C are passed through gate 36C and an OR funnel 36 to the directory. Gate 36F is activated if the address in trigger 21 does not require translation, which is signalled by inverter 36E. It can directly be looked up in directory 34 when the address bits 8–20 are passed from gate 36F through OR funnel 36.

The directory lookup operation is begun simultaneously with obtaining bits 8–20 for the input to OR funnel 36. That is simultaneously, bit positions 20–25 of trigger 21 are being transferred to a column decoder 33 to locate a column in cache directory 34, regardless of whether address trigger 21 contains an invalidation request or a processor request. The output bits 8–20 from funnel 36 are inputted to each of sixteen row compare circuits 37. Each row compare is a comparison of the received funnel bits 8–20 with each of sixteen sets of bits 8–20 found in the 16 rows of the column selected by column decoder 33 using its inputted bits 20–25 from the address trigger 21. A compare equal by one of the eixteen comparisons in circuits 37 indicates a cache hit and activates a corresponding one of output lines 0–15.

Accordingly, if the requested address in triggers 21 is found in the directory, one of the sixteen outputs 0–15 will be activated. If the requested address is not found, none of the sixteen outputs will be activated, and a not found signal is activated on line 37E.

During the next cycle, bit positions 20–28 in address latch 22 are transferred into bit positions 4–12 in a cache address register 23, in which bit positions 4–9 select the column of the block to be selected in the cache or cache directory. At the same time, row encoder 37C receives the outputs 0–15 from row compare circuits 37 and encodes the one in sixteen signal into a four bit combinatorial signal, which is inputted into bit positions 0–3 of cache address register 23.

Therefore, the test for whether a valid block is found to exist in the cache for each invalidation request from BIAS 13 is done by OR circuit 37D when it receives signals from outputs 0–15 from row compare circuits 37. If no valid block address exists in the cache directory, no output will be activated from OR circuit 37D. If a valid block is found, OR circuit 37D will pass the one of the sixteen outputs 0–15 of row compare circuits 37 which is activated due to a compare-equal of one of the sixteen values in the selected directory column with request bits 8–20 from funnel 36. If activated, OR circuit 37D applies a found block signal to AND gate 23D, so that it will set trigger 23C if a BIAS request is responsible for this cache operation. If none of outputs 0–15 is activated, no block will be selected in the cache.

For local processor accesses (indicated by no invalidate signal existing in request latch 23G), the output from cache address register 23 is provided to the cache via AND gates 23J, 23K and 23L for row, column and doubleword location, respectively, in the cache. Inverter 23I then activates gates 23J, K and L.

However, if an invalidate signal exists in latch 23G, inverter 23I inhibits gates 23J, K and L; and instead gates 23E and 23F are enabled to route the row and column signals back to the directory again to locate the required block valid bit, and it is then set invalid with the invalidate signal on line 23H.

In this manner BIAS requests go back a second time into the cache directory to set the invalid bit for the selected block to its invalid state; while for normal processor requests, the same output of the cache address register 23 would instead be used during the machine cycle for accessing a double word in the cache.

FIG. 3 illustrates a minimum hardware embodiment using a filter memory having a single entry provided by filter register 44 with a validity bit 45. FIG. 4 illustrates an embodiment with a two entry filter memory. In FIGS. 3 and 4, an OR funnel 41 outputs one store request at a time, which is a store address received from a local or remote channel, or a remote processor. However, the embodiments of FIGS. 3 and 4 filter only remote processor and remote channel store requests. They do not filter local channel store requests, because a wiring simplification may be obtained in some MP configurations by grouping the store requests of a processor and its physically related channels. Very little degradation in filter operation has been found to occur due to not filtering local channel store requests, because they are relatively infrequent compared to the much faster rate that either processor can generate store requests, e.g. perhaps one channel request to a 100 processor requests. The store requests from the remote processor and the remote channels are filtered by controlling a filter gate 42 by means of the output of a compare circuit 47 and an inverter 48.

Initial reset of the system sets each validity bit 45 to the invalid state, which forces each circuit 47 to output a non-equal output which enabled filter gate 42 to pass to BIAS the first received invalidation request and enables a gate 43 to record the first invalidation request into the filter memory.

Compare circuit 47 will provide a non-equal output as long as its inputs are not equal, or its inputted valid bit 45 indicates the invalid state. Valid bit 45 is set to its valid state when an inputted store request is loaded into a filter register. The non-equal output of circuit 47 activates the output from inverter 48, which enables an invalidation request to be passed through gate 42 to the associated BIAS and enables gate 43 to load the invalidation request into the connected filter register.

Each store request passing through funnel 41 is inputted to filter gate 42, which does the filter function by inhibiting or passing the store request to the associated BIAS as determined by the operation of all connected compare circuits 47. Whenever circuit 47 indicates the compared addresses are equal, the output from inverter 48 inhibits the store request from going to BIAS, since the equal compare indicates it was previously provided to BIAS. The inverter output also inhibits the inputted store request from being loaded into any filter register so that its previous contents remain valid.

Local channel stores are not filtered because they cannot cause any compare equal operation in any compare circuit in FIGS. 3 and 4. Hence, they will all pass through OR funnel 41 and gate 42 to BIAS, because compare circuit 47 is then providing a non-equal signal. Each local channel request is loaded into filter register 44, but it can not perform any filtering function because the local channel requests are not received by the other input to any compare circuit 47.

Each invalidation address on line 40, in the filter memory, and outputted to BIAS is truncated at its low-order end to a cache block boundary address, i.e. in a 24 bit address in bit positions 8–31, positions 8–25 are significant and positions 26–31 are zeroed or truncated. This changes the received request from a double word address to a cache block address. This is also done in each of the embodiments herein.

The embodiment in FIG. 4 is considered the preferred embodiment because of its circuit simplicity and good performance. It differs from the embodiment described in FIG. 3 because it has a filter memory with two entries which are provided by filter register 1 and filter register 2 having respective valid bit positions 45-1 and 45-2. The filter registers are loaded in a first-in, first-out (FIFO) basis with the loading sequence controlled by a FIFO replace circuit 46 which is a trigger flip-flop, wherein each time it receives an input pulse from inverter 48, it flips to its opposite bistable state. When trigger 46 is set to its true (t) state, it conditions a gate 43-1 to load the next store request address into filter register 1 and activates an AND gate 49-1 to set valid bit 45-1 to its valid state. On the other hand, if the trigger is set to its complementary state (c), then gate 43-2 is conditioned to load the next store request address into filter register 2 and AND gate 49-2 sets valid bit 45-2 to its valid state.

In FIG. 3 or 4, every entry in the filter memory is invalidated whenever the local processor performs a block fetch, regardless of whether or not the inputted store request is equal to any valid address in the filter memory. A block fetch is signalled by the FAR block 1st advance line from the main storage (MS) of the system upon MS fetching the first double word of a cache block. Hence, the 1st advance signal occurs at the beginning of the cache block transfer to then reset every valid bit 45 to its invalid state, which makes unavailable the contents of every filter register for filtering use.

In FIG. 4, the two comparators 47-1 and 47-2 simultaneously compare an inputted store request with both valid addresses stored in filter registers 1 and 2. One Line 40 applies the remote store request to an input of each of the comparators 47-1 and 47-2. Another input to the comparators is connected to the outputs of the valid bit positions 45-1 and 45-2, respectively. If a bit 45 is set to invalid state, it forces its connected comparator to output an unequal signal. If either comparator finds equality between the received address and the address in its connected filter register while its valid bit is set, the comparator provides an equal output, which inhibits filter gate 42 due to the inverter 48 then providing a non-active signal to gate 42. The received store request is not therefore transferred to BIAS. Furthermore, the non-active condition at the output of inverter 48 does not provide any input to FIFO trigger 46, and therefore it retains its prior state.

Figure 5:
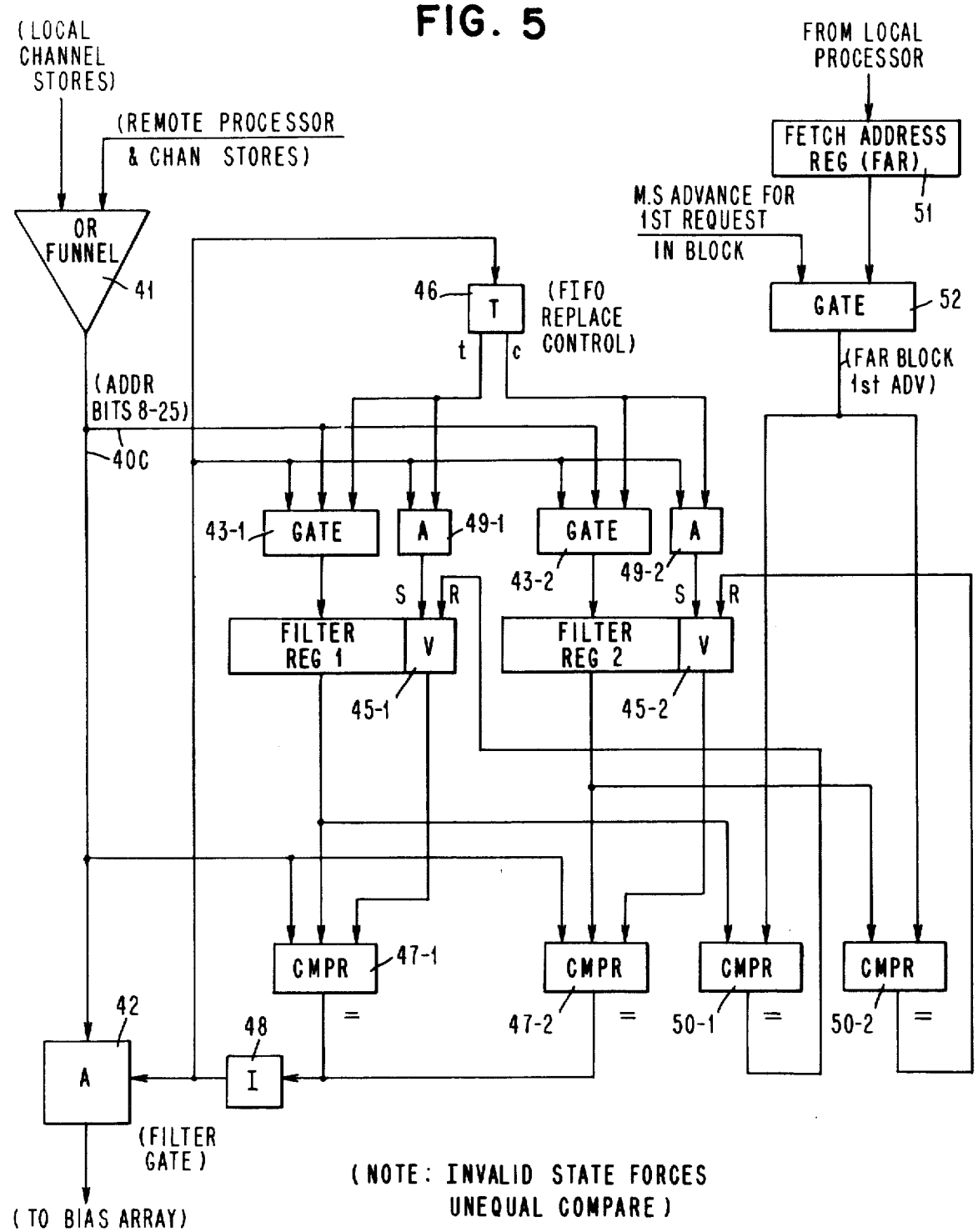

The embodiment shown in FIG. 5 provides more efficient invalidation control internal to the filter memory than is found in the embodiment shown in FIG. 4. Instead of making all entries in the filter memory invalid upon the occurrence of a block fetch by the local processor as was done in FIG. 4, FIG. 5 only invalidates a filter register if its address is equal to the address of the block fetch. Therefore, if addresses in the filter memory are valid but not equal to the block fetch address, no address is invalidated in the filter memory. This eliminates having to reload the same address into the filter memory and also passing it to BIAS when it is active in the local processor, and this feature provides theoretically greater efficiency in the operation of the filter memory than the embodiment of FIG. 4, but at the expense of more control hardware. The additional hardware in FIG. 5 includes a pair of comparators 50-1 and 50-2 which respectively determine equality between the block fetch address in FAR and the content of filter register 1 and filter register 2 for controlling the reset of respective validity bits 45-1 and 45-2. In FIG. 5, the block fetch address to the comparators 50-1 and 50-2 is derived from gate 52, which receives the main store advance for the first request in a cache block, and the output of the fetch address register (FAR) 51 which is making the request for the cache block fetch from main store.

Another difference in FIG. 5 over FIGS. 3 and 4 is that in FIG. 5 all store request passing through funnel 41 are filtered, which includes local channel request as well as the store requests from the remote processor and the remote channels. All requests are provided to the filter memory and its comparator 47 on lines 40C from the output of funnel 41.

Figure 6:
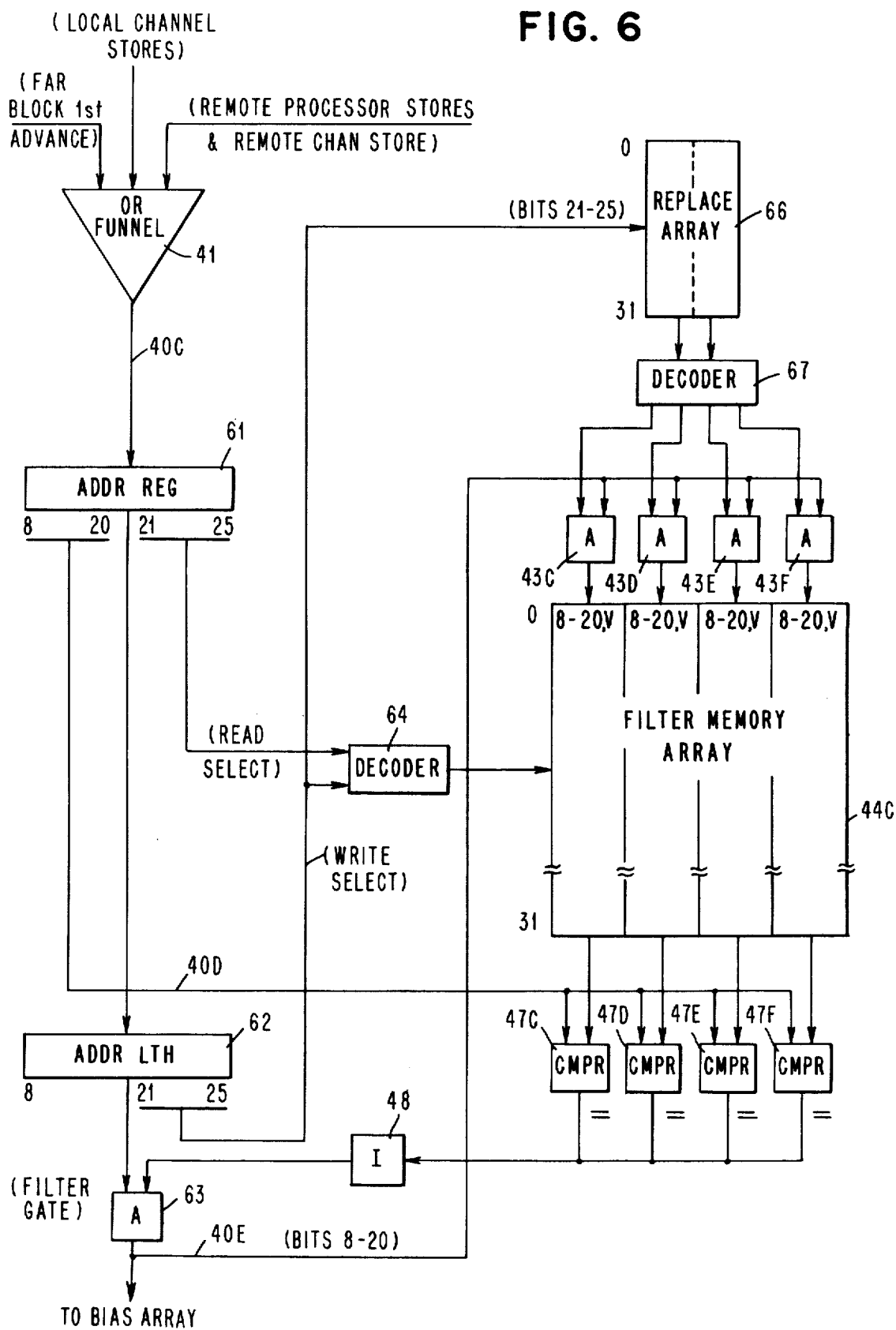

FIG. 6 illustrates an embodiment in which the filter memory is an array 44C. All store requests (except from the local processor) are filtered. The output of the OR funnel 41 is provided to address register 61 which contains the address for one machine cycle and outputs it to an address latch 62 which retains the address for one machine cycle with ½ cycle overlap and provides it to filter gate 63. Bit positions 21-25 in address register 61 are applied to the read input of a decoder 64 to select a row in array 44C which has four columns for simultaneous read out of four recorded addresses respectively to comparators 47C, D, E, and F which respectively compare the content of address bits 8-20 (read from respective ones of the four columns) with bits 8-20 in address register 61. If any comparator finds its inputs are equal, it provides an equal output signal to inverter 48 which inhibits filter gate 63 so that the invalidation address in latch 62 does not get transferred to the BIAS memory, in the manner previously explained.

On the other hand, if all of the comparators 47C-F provide a non-equal output, inverter 48 provides an active output signal to gate 63 which passes the invalidation address from latch 62 to the BIAS memory, and also enables invalidation address bits 8-20 to an input of each of AND gates 43C-F. The selection of one of the loading gates 43C-F is done by the enablement of one of four output lines from a replace array 66, while latch 62 is supplying bits 21-25 through row decoder circuit 64 to select a filter memory row. The column in the selected row in memory filter array 44C is selected by the active line from replace array 66.

Replace array 66 consists of the same number of rows found in array 44C, and each row has two binary bit positions. Whenever the two bit value in a replace array row is read out to its decoder 67, it is incremented to the next higher value (module 4), e.g. 00, 01, 10, 11, 00, etc. Thus, the four values for each row are incremented in sequence in a round robin fashion for selecting a column in the filter memory array for writing the inputted address bits 8-20 and a validity bit V set to valid state.

Thus, one invalidation address entry is written into array 44C at a time, but four entries are simultaneously read out in a four way set-associative manner. Writing and reading occur at a different clock time because they are operated at different one-half cycle periods by circuits 61 and 62.

Figure 7:
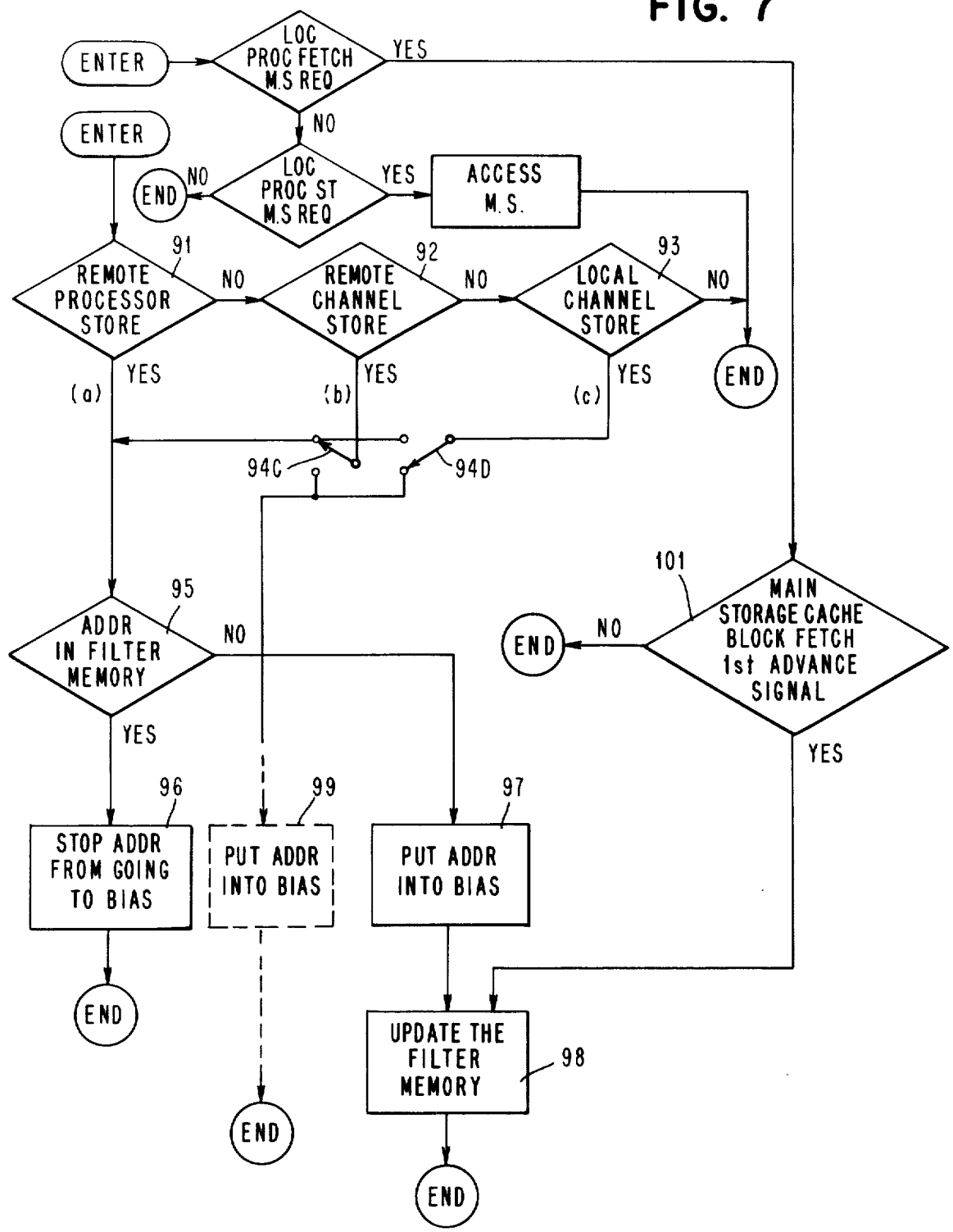
FIG. 7 is a flow diagram representing the operation of the invention.

FIG. 7 illustrates the overall operation of the invention. The settings of switches 94C and 94D represent the circumstances where BIAS filtering may be done with (1) only remote processor stores or (2) with only remote processor stores and remote channel stores, or (3) with remote processor stores, remote channel stores and local channel stores. The setting illustrated is (2) i.e. the filtering of remote processor stores and remote channel stores being filtered but local channel stores not being filtered because the local channel stores pass through switch 94D to box 99 which puts the address into BIAS. It is clearly seen in FIG. 7 that a local processor fetch request initiates a main storage cache block fetch first advance signal, and local processor store requests merely cause access of the local cache and main storage (MS) for storing a double word.

Although the invention has been shown and described with respect to plural embodiments thereof, it should be understood by those skilled in the art that various changes and omissions in the form and details of the invention may be made therein without departing from the spirit and the scope of the invention, which is to be limited only as set forth in the following claims.

What is claimed is:

1. Means for reducing cache interference caused by remote processor or channel store accesses of a shared storage in a multiprocessing system, each processor having its own cache and its own buffer-invalidation-address-stack (BIAS), each processor having a BIAS filter memory for storing remote store request addresses received from another processor or from a channel, comparing means connected to an output of the filter memory and receiving each remote store request address, the comparing means comparing each received address with each current address in the filter memory to determine equality or inequality on a selected block size basis, means for transferring the received remote store request address into the BIAS and into the BIAS filter memory when the comparing means provides an output signal indicating the received address is not validly contained in the filter memory, and the transferring means enabling the transfer of a received remote store request address into the local BIAS when the comparing means provides an output signal indicating the received address is validly contained in the filter memory.

2. Means for reducing cache interference as defined in claim 1, further comprising a validation bit being associated with each entry in the filter memory, and means for synchronizing the resetting of the valid bit to indicate an invalid state for the associated entry with the beginning of a block fetch by the processor.

3. Means for reducing cache interference as defined in claim 1, further comprising, means for invalidating all addresses contained in the BIAS filter memory when the processor initiates a block fetch for its cache.

4. Means for reducing cache interference as defined in claim 1, further comprising, means for invalidating an address currently in the filter memory whenever the address compares equal to an address for a block fetch initated by the processor.

5. Means for reducing cache interference as defined in claim 1, in which the filter memory further comprises a single entry for containing a block-boundary address.

6. Means for reducing cache interference as defined in claim 1, in which the filter memory further comprises a plurality of entries for respectively containing block-boundary addresses, each entry having an associated valid bit.

7. Means for reducing cache interference as defined in claim 1, in which the transferring means also includes a filter gate receiving the received addresses and enabled by an unequal indication in the comparing means, a BIAS input connected to the output of the filter gate, whereby the BIAS stores the received addresses when the comparing means provides an unequal indication.

8. Means for reducing cache interference as defined in claim 6, further comprising, replacement determination means for selecting which entry in the filter memory is to be loaded with the next received address for which the comparing means indicates no equality with any block address validly contained in the filter memory.

9. Means for reducing cache interference as defined in claim 6, in which the filter memory consists of two registers, each register having a valid bit position, and means for invalidating the state of the valid bit for a selected one of the registers, the invalidating means being connected to a main storage first fetch advance line.

10. Means for reducing cache interference as defined in claim 9, further including, replacement control means comprising a bistable circuit having a triggering input connected to the output of the comparing means for being flipped to another bistable state by the comparing means output signal indicating the received address is not validly contained in the filter memory, register input gates having outputs respectively connected to inputs of the registers, the register input gates having inputs receiving each received address and being conditioned by the unequal output signal of the comparing means, and true and complement outputs of the bistable circuit respectively conditioning the two registers input gates in an opposite sense, whereby the two registers will alternately be loaded.

11. Means for reducing cache interference as defined in claim 10, further comprising AND gates respectively having outputs connected to set inputs of the valid bit positions of the two registers, an input to each AND gate being activated by an unequal indication in the comparing means, each AND gate having another input connected in an opposite sense to the true and complement outputs of the bistable circuit, whereby an unequal indication in the comparing means alternately sets one of the valid bits to a valid state.

12. Means for reducing cache interference as defined in claim 11, further comprising, a main storage first fetch advance line being connected to a reset input of each valid bit position, whereby all valid bit positions are reset to an invalid state on each signal from the main storage first fetch advance line.

13. Means for reducing cache interference as defined in claim 9, in which the means for invalidating further includes, a pair of FAR compare circuits, each FAR compare circuit comparing a valid address in a respective register with an address from a block fetch address register (FAR) gated to the FAR compare circuit on the granting of main storage priority to the address in FAR, an equal indication in each FAR compare circuit providing a reset input to a respective valid bit position to indicate the associated register contains an invalid address.

14. Means for reducing cache interference as defined in claim 1, in which the filter memory further comprises, a filter memory array containing a plurality of entries for respectively containing block-boundary addresses, each entry having an associated valid bit, a replace array for determining which entry in the filter memory array is next to be loaded with a remote store request.

15. Means for reducing cache interference as defined in claim 1, in which the remote store requests are addresses derived from a remote processor or a channel of the remote processor, whereby store requests from any channel with the processor local to the BIAS filter memory are passed to BIAS and are not entered into the BIAS filter memory.

16. A method for reducing cache interference caused by remote store accesses of a shared storage in a multiprocessing system in which each processor has a cache directory, the method comprising each processor selectively storing in a filter memory remote store request addresses received from another processor or from a channel, comparing each valid entry in the filter memory with each received remote store request address to determine equality or inequality on a cache block size basis, transferring each received remote store request address into the BIAS filter memory and interrogating the cache directory with the received remote store request address when the comparing step indicates inequality, and inhibiting the received remote store request address from entering the filter memory when the comparing means indicates equality, whereby received remote store addresses are filtered before being permitted to interrogate the cache directory.

17. A method for reducing cache interference as defined in claim 16, further comprising, invalidating all addresses contained in the filter memory when the processor initiates a block fetch for its cache.

18. A method for reducing cache interference as defined in claim 16, further comprising, invalidating an address currently in the filter memory whenever the address compares equal to an address for a cache block fetch initiated by a local processor.

19. A method for reducing cache interference as defined in claim 18, in which the filter memory further comprises invalidating an address in the filter memory by resetting a validity bit associated with the address.

20. A method for reducing cache interference as defined in claim 19, the transferring step further comprising, selecting a next entry in the filter memory to be loaded with the next received address for which the comparing means indicates no equality with any block address validly contained in the filter memory.

21. A method for reducing cache interference as defined in claim 16, further comprising, invalidating a corresponding directory address entry if found in the cache directory in response to the interrogating step.

* * * * *